UNITED STATES PATENT OFFICE.

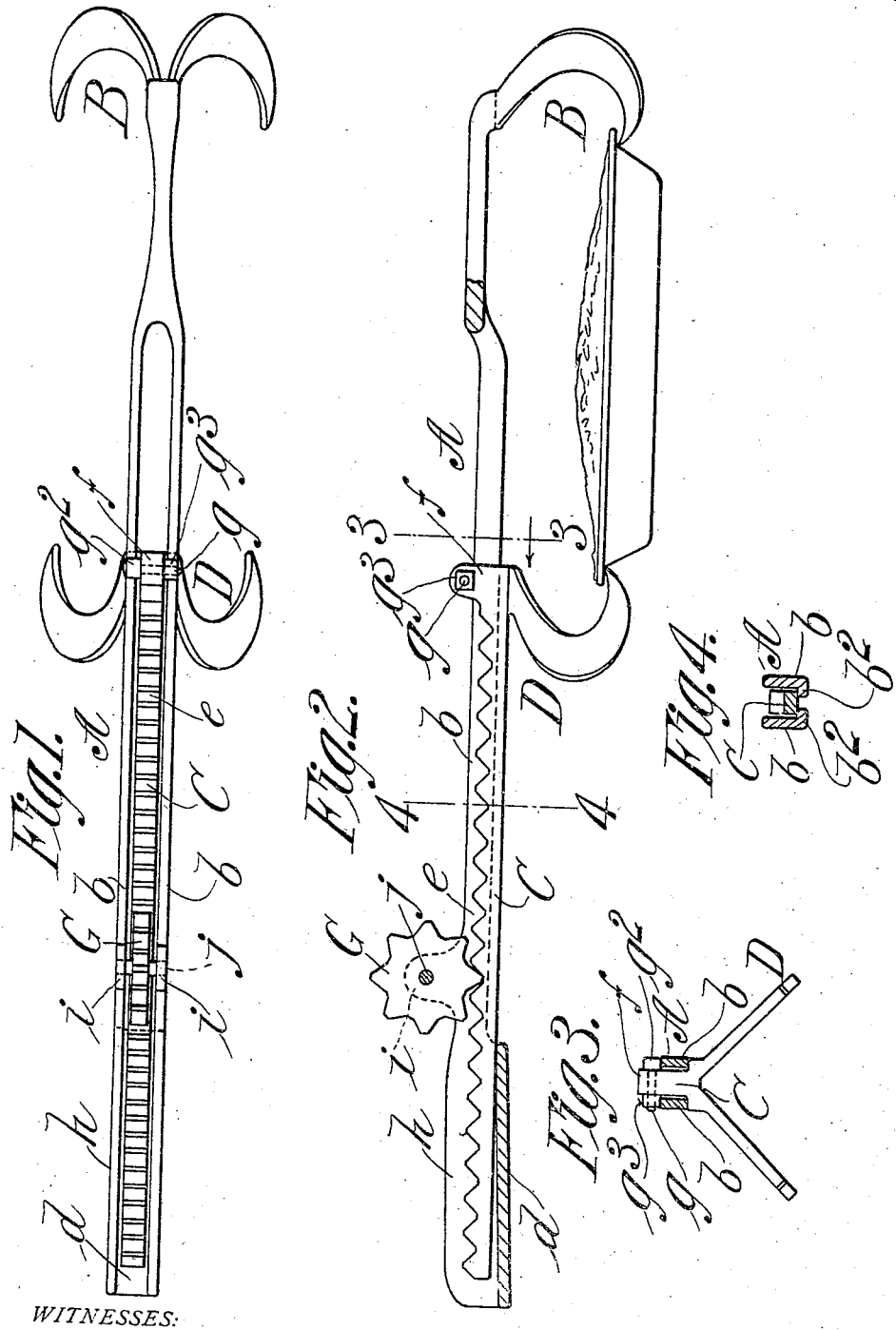

ALFRED O. BONIN AND LOUIS P. BEAULIEAU, OF HOLYOKE, MASSACHUSETTS.

DISH-LIFTING DEVICE.

946,324.  Specification of Letters Patent.  Patented Jan. 11, 1910.

Application filed September 17, 1909. Serial No. 518,177.

*To all whom it may concern:*

Be it known that we, ALFRED O. BONIN and LOUIS P. BEAULIEAU, citizens of the United States of America, and residents of Holyoke, in the county of Hampden and State of Massachusetts, have invented certain new and useful Improvements in Dish-Lifting Devices, of which the following is a full, clear, and exact description.

The object of this invention is to produce a device for lifting plates, baking pans and other dishes out from ovens, which comprises a movable jaw adjustably operative relatively to a fixed jaw with means for conveniently effecting the adjustment of the movable jaw, and which device is not only simplified by reason of the nature and manner of combination of the very few component parts, but, moreover, is susceptible of utilization more conveniently than has been the case in dish lifting devices of the somewhat general character heretofore constructed.

The improvements are hereinafter described in conjunction with the accompanying drawings and set forth in the claims.

In the drawings:—Figure 1 is a plan view of the improved dish lifting device. Fig. 2 is substantially a central longitudinal vertical section through the device; Fig. 3 is a cross section on line 3—3, Fig. 2; Fig. 4 is a cross sectional view as taken through an intermediate part of the shank portion of the device for showing a structural feature hereinafter referred to.

In the drawings, A represents a shank bar provided at its forward extremity with a downwardly and rearwardly curved yoke-shaped jaw B and constructed to the rear thereof with separated parallel side members $b\ b$ having a web $d$ uniting them at the base of their rear portions for constituting a handle.

C represents a rack bar having its teeth $e$ at its upper edge; and said rack bar is slidably engaged between the opposite side members $b\ b$ of the shank and is provided at its forward end with a downwardly and forwardly curved yoke-shaped dish engaging jaw D. The rear portion of said rack bar is in slidable engagement on the aforesaid rearwardly located uniting web $d$, and it has at its forward portion a lug $f$ upstanding above the top edges of the separated shank bar side members $b\ b$. The headed bolt $g$ is transversely engaged through said lug and has its head $g^2$ resting on the upper edge of one shank bar side member, while the nut $g^3$ screwed on the other end of the bolt has an engagement on the upper edge of the other shank bar side member; and thus the forward portion of the jaw provided rack bar has an overlapping and slidable engagement with the shank bar which comprises the parallel separated members as aforesaid. The opposite side members $b\ b$ of the shank bar have adjacent and forward of the handle constituting rear portion $h$ of the shank bar opposed upwardly extending lugs or ear pieces $i\ i$ through which a journal stud or rivet $j$ is passed for a support thereof and a toothed wheel G is journaled on the said stud or rivet $j$ and is in engagement with the teeth of the said rack bar.

In the use of the implement the same is grasped by the handle constituting portion and the rack bar is longitudinally moved by the operation of the thumb on the toothed wheel so that the movable jaw D is properly positioned relatively to the fixed forward jaw B for the engagement of the dish. The disengagement of the dish may be effected by a very slight further manipulation of the toothed wheel.

It will be perceived that this device consists of three parts, the jaw carrying shank bar, the rack bar and the toothed wheel, with, of course, the addition of the bolt $g$ and stud or rivet $j$; and these parts may be very cheaply constructed of light castings.

Inasmuch as in view of its desired lightness the rack bar C may have a slight tendency to sag or be crowded downwardly about the toothed wheel G, the shank bar side members $b\ b$ may be cross sectionally of the form shown in Fig. 4, that is they may have at their lower edges inwardly extending recesses or ledges $b^2\ b^2$ for a reinforcement of the support on which the rack bar slides.

We claim:—

1. In a dish lifter, in combination, a shank bar having, at its forward extremity, downwardly and rearwardly curved dish engaging jaws, constructed to the rear thereof with separated side members, having its rear end formed to constitute a handle and provided at its separated portions next forward of the handle with upwardly extending opposing ear pieces having a journal stud supported by and extending between them, a rack-bar, having the teeth thereof at its upper edge, slidably engaged between the opposite side members of the shank and provided at its forward extremity with a downwardly and forwardly curved dish-engaging jaw, and a toothed wheel mounted on said journal stud between said opposing ear pieces in engagement with the teeth of the jaw provided rack bar and in proximity to the handle constituting rear portion of the said shank.

2. In a dish lifter, in combination, a shank bar provided at its forward extremity with a downwardly and rearwardly curved dish engaging jaw and constructed to the rear thereof with separated side members, having a web uniting them at the base of their handle constituting portions, a rack bar,—having its teeth at its upper edge,—slidably engaged between the opposite side members of the shank, provided at its forward end with a downwardly and forwardly curved dish engaging jaw, having its rear portion in slidable engagement on said rearwardly located uniting web and having at its forward portion a lug upwardly extending above the top edges of the separated shank bar side members, a headed bolt transversely engaged through said lug, with its head lying on the upper edge of one shank bar side member and a nut screwed on the other end of the bolt and engaging the upper edge of the other shank bar side member, and a toothed wheel pivotally mounted at the upper edge of, and carried by, the rear portion of the shank bar, in engagement with the teeth of said rack bar and having its location in proximity to the handle end of the shank.

Signed by us at Springfield, Mass., in presence of two subscribing witnesses.

ALFRED O. BONIN.
LOUIS P. BEAULIEAU.

Witnesses:
G. R. DRISCOLL,
WM. S. BELLOWS.